Figure 3:
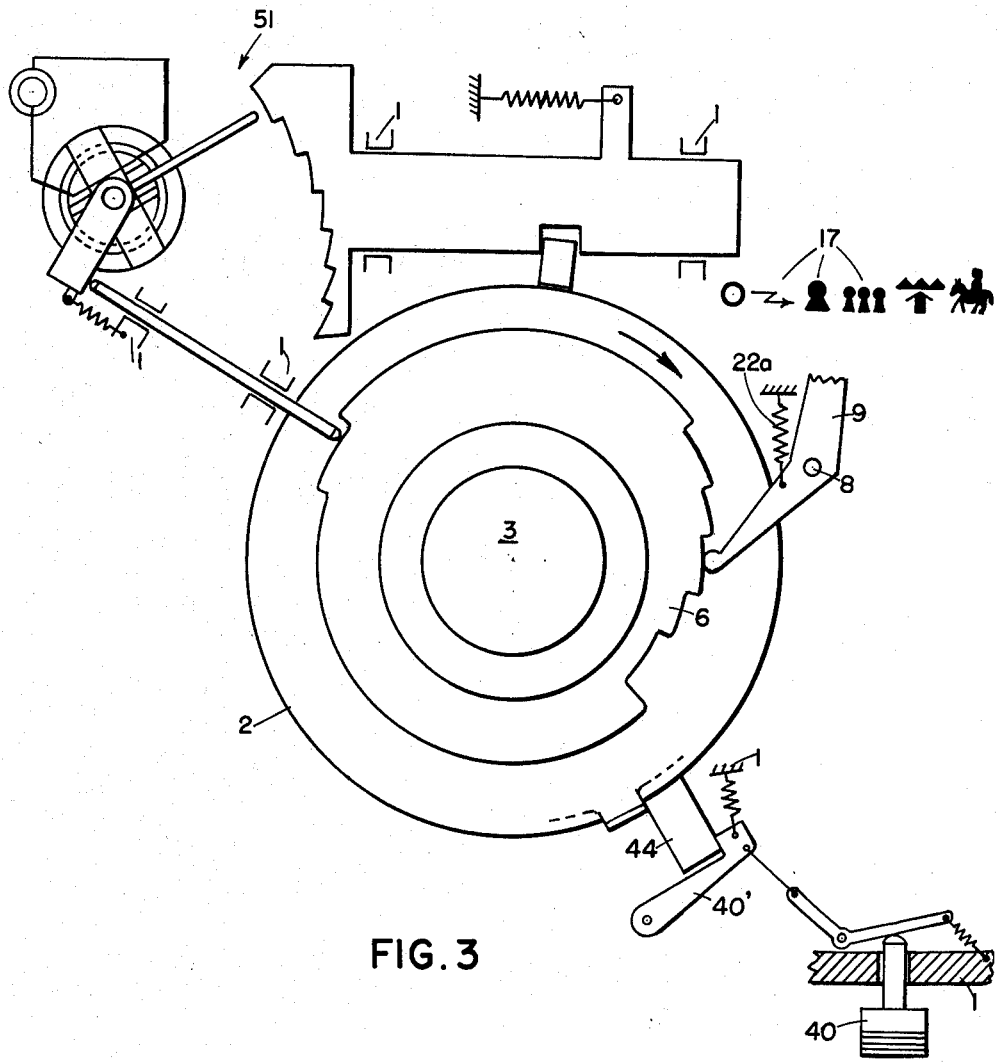

Oct. 22, 1963  G. HAUSMANN ETAL  3,107,593
INDICATOR MEANS FOR CAMERAS
Filed Jan. 12, 1961  2 Sheets-Sheet 1
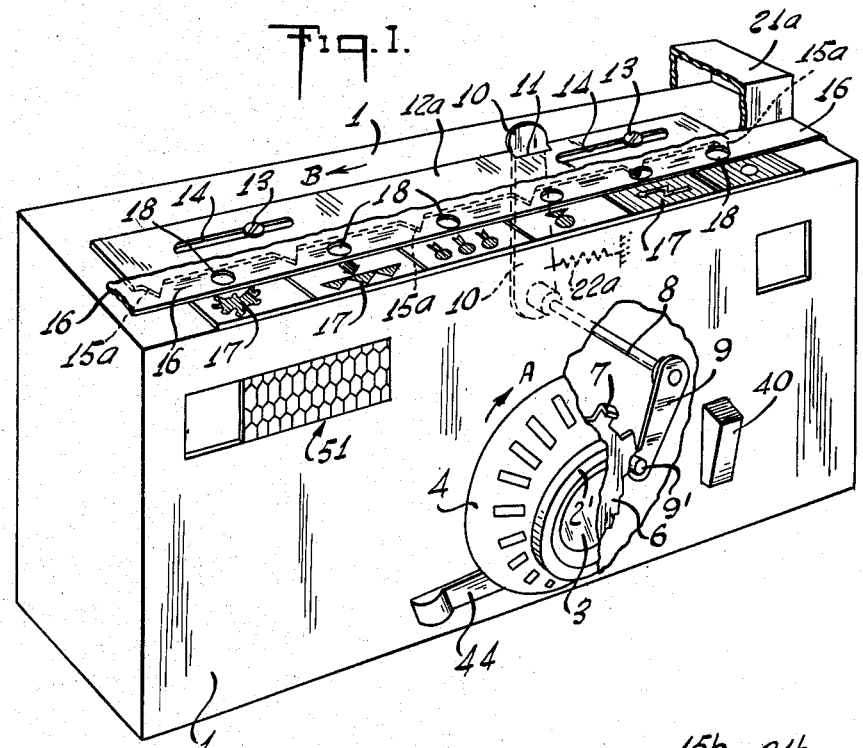
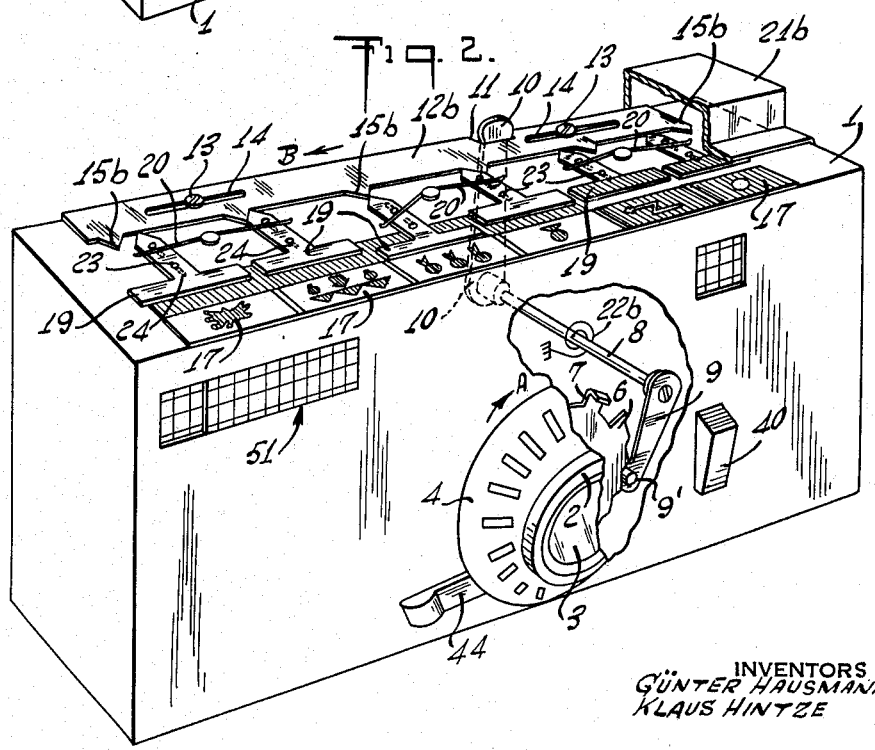
INVENTORS
GÜNTER HAUSMANN
KLAUS HINTZE INVENTORS:
Günter Hausmann
Klaus Hintze

United States Patent Office 3,107,593
Patented Oct. 22, 1963

3,107,593
INDICATOR MEANS FOR CAMERAS
Günter Hausmann and Klaus Hintze, Dresden, Germany, assignors to VEB Kamera- und Kinowerke Dresden, Dresden, Germany
Filed Jan. 12, 1961, Ser. No. 82,220
9 Claims. (Cl. 95—11)

The present invention relates to indicator means for photographic cameras, particularly for use in conjunction with indicator symbols on a so-called subject scale.

It is known to apply indicator symbols for scales of cameras wherein an index points to certain exposure values identified by symbols instead of numerals and/or legends. Such scales are usually provided on the adjusting tubes or rings of the objective and/or of the between-the-lens shutter; in some instances, they are applied to control knobs or discs arranged on different parts of the camera. The surfaces used for the application of such symbols are without exception relatively small, sometimes arcuate, not always easy of access, so that their reading is considerably handicapped.

One solution has been proposed, in which a push-button assembly is used, each of the buttons being provided with a symbol corresponding to the function to be performed when the particular button is actuated.

Such push-button units, although well visible, have the drawback of a relatively intricate mechanism required for transmitting the action from a depressed button to the related part, such as the diaphragm blades, the time cam of the shutter or other actuated elements. Besides controlling the actuated camera element, the push-buttons must also disengage any or all previously actuated push-buttons so that they may return to their neutral positions.

Another major disadvantage of these assemblies is that the operator's hand must constantly change its position in accordance with the location of the buttons to be operated, since they form an array over a relatively wide area. The material size of the push-buttons, on the other hand, cannot be reduced owing to the correlation with the operator's fingers. If the camera is to be operated in cold weather, when the operator wears gloves, the size of the buttons cannot be made large enough with a view to avoiding erroneous operation of two adjoining buttons. This could even lead to jamming of the mechanism.

If the push-button assembly is provided on one of the sides of the camera, the operator is tempted to carry out the adjustment without looking because he would have to tilt the camera sideways for visual inspection. This "blind" operation also brings about the danger of erroneous settings. Only prolonged and intensive practice on the same camera, as with a typewriter, will provide sufficient security. In a radio receiver, for example, where the controls are usually actuated more frequently than on photographic cameras, experience shows that visual operation is almost indispensable.

In an attempt to overcome these and other difficulties, the problem of providing convenient and simple indicator means has been solved with the present invention. One object of the invention is to provide a unitary, easy-to-operate and easily visible indicator system, preferably arranged on the top surface of the camera, cooperating with a single adjusting member, or a minimum of the adjusting rings of the camera, located close by.

In the present invention, the problem has been solved by providing a special symbol for each value or combination of values that can be set on the camera. These symbols form a subject scale which is indicative of the time (shutter), the aperture (diaphragm), the range and other settings, alone or in combination. A built-in exposure meter can also be made to cooperate with the adjusting elements the operative positions of which are unmistakably shown by the symbols of the subject scale.

An important feature of the present invention resides in the provision of a slide movable preferably along one of the sides of the camera and coordinated with a plurality of symbols forming a subject scale over a readily visible, relatively large plane surface of the camera. The slide has indexes which select the symbols to correspond to the adjustment of the shutter time and range. The indexes are so disposed that a single indication will prevail at any given moment.

According to a preferred embodiment of the invention, the indicator means comprising the slide and the subject scale with the symbols is arranged on top of the camera, so that the operator can see the latter without difficulty before, during and after taking a picture.

Another essential feature of the invention is that the indicator means is controlled by a multi-position cam or similar member actuated, in turn, by a common adjusting element of the camera, serving preferably for the combined adjustment of exposure time, aperture and range. The cam mechanism is arranged to transmit a relatively small angular rotation into a much larger linear movement for foolproof and easy operation in use. The adjustment element may or may not be interconnected with a separate diaphragm control; also, a galvanometer may be built in for semi or fully automatic cooperation with the aperture adjustment.

Other objects and advantages of the invention will be readily appreciated and better understood by reference to the following detailed description, when considered with the accompanying drawings, wherein FIG. 1 is a perspective front view, with parts broken away and shows a camera equipped with indicator means according to the present invention;

FIG. 2 is a view similar to that of FIG. 1 and shows a camera with a modified indicator means; and FIG. 3 is a schematic view of the functional arrangement of the adjusting and control elements of a camera equipped with indicator means according to the present invention.

As shown in the drawings, the camera housing 1 carries on its front plate an objective 3 with a between-the-lens shutter 2, surrounded by an adjusting member 4. The operating mechanism for the shutter is provided with a cocking lever 44 that protrudes from under the adjusting member 4 so the mechanism may be tensioned by clockwise rotation before each exposure. At 51, the window of a built-in galvanometer-type exposure meter is shown. The shutter release knob 40 protrudes from within the camera housing 1.

The shutter mechanism may also be cocked by the film-transporting mechanism driven by a small electric motor (not shown). In this case, the cocking lever 44 does not protrude outside the camera housing 1 as shown in FIGS. 1 and 2.

Coaxially to the objective axis, the camera comprises a control cam 6 provided with a lug 7 for cooperating with the adjusting member 4. The cam 6 is also provided with stepped sections on its periphery. A shaft 8 journaled in the camera housing 1 carries an arm 9 on its forward end. The arm 9 carries a pin 9' which engages the stepped peripheral portions of the cam 6. The rear end of shaft 8 is provided with a substantially vertical transmission lever 10 which is biased to keep the pin 9' in contact with the periphery of the cam 6, in FIG. 1, by a spring 22a anchored on a suitable part of the camera frame. In FIG. 2 an alternative solution is illustrated by a spiral spring 22b acting on the shaft 8 directly.

On top of the camera housing 1, there is a slide displaceable along the camera within predetermined limits. In FIG. 1, this slide is 12a and in FIG. 2, the slide is 12b. In each case the slide 12a or 12b is shown to have slots 14 cooperating with limiting guide screws 13 secured to the camera housing. The extremity of the transmission lever 10 opposite the shaft 8 engages a cut-out portion of slide 12a in FIG. 1 and of slide 12b in FIG. 2.

In the embodiment of FIG. 1, the slide 12a of the indicator means has a plurality of indexes 15a spaced apart along its front edge. Part of the slide 12a and all of the indexes 15a are covered by a plate 16 attached to the camera. This plate 16 is provided with apertures 18 in a number corresponding to the number of indexes. Along the front top edge of the camera, a subject scale is arranged in the form of a plurality of symbols 17, each of them being aligned with one of the apertures 18 of the plate 16. Selective movement of the slide 12a will shift one of the indexes 15a into view under one of the apertures 18, to indicate the setting. A hood 21a attached to the camera housing protects the slide 12a and its control mechanism.

In FIG. 2, an alternative embodiment of the indicator means is shown, wherein the slide 12b has a plurality of projections 15b disposed in predetermined spaced relation, so selective actuation of the slide 12b will move a selected indicator or index plate 19 into view. Several index plates 19 are disposed laterally along the length of the slide 12b. Each index plate 19 is associated with two slots 24 in the camera body that allow reciprocation of the index plate, as guided by its screws 23, in a direction substantially perpendicular to the direction of motion of slide 12b. The forward areas of the index plates 19 are adapted to provide an indication of the selection by the slide 12b. Such front area of index plate 19 may cover an existing color below it and bring its own color into view, and thus attract attention by the contrast of color. Normally the index plates 19 are in retracted position, to which they are individually biased by springs 20 acting an screw 23. In this embodiment, in FIG. 2, a hood 21b is made to cover both the slide, the index plates and their respective mechanisms.

In either modification, in FIG. 1 or in FIG. 2, when the adjusting member 4 is rotated so as to set the camera for exposure, the control cam 6 is also rotated by the intermediary of the lug 7. The pin 9' at the end of arm 9 follows the cam edge portions of the cam 6, transmitting the motion to the shaft 8, the lever 10 and the associated slide 12a in FIG. 1 or 12b in FIG 2.

In FIG. 1, the distances between the indexes 15a are chosen so that while the slide 12a moves from the right-hand end of the figure to the left-hand end, as shown by arrow B, as a result of a clockwise rotation of the adjusting member 4 and the cam 6, as indicated by arrow A, one of the indexes 15a will successively appear through the apertures 18 from the left towards the right. The appearance of an index behind the aparture indicates that the symbol 17 adjacent thereto is the one denoting the actual camera setting. The disposition of the indexes 15a relative to their associated apertures 18 is determined by the settings desired and the extent of adjusting motion, so only one index will appear at any given time behind the apertures. The difference between the distances of the two extreme indexes 15a and of the two extreme apertures 18 is smaller than the distance between any of the adjoining apertures 18.

In an analogous fashion, the clockwise rotation of member 4 in direction of arrow A will displace in FIG. 2 the slide 12b to the left in direction of arrow B. One of the projections 15b will come into engagement with the corresponding index plate 19 and shift it, against the force of the biasing spring 20, towards the associated symbol 17. The spacing of both the projections 15b and the abutting rear tips of the index plates 19 is similar to that described with reference to the indexes 15a of the first embodiment relative to the apertures 18. In FIG. 2, the engaged index plate 19 will cover part of the camera top, indicating thus the camera setting by the difference in color between the respective surfaces. Additionally, the symbols may be arranged in groups identified by their colors and the complementary or different colors of the associated index plates. For example, four of the symbols are in black on a white background, while the remaining two are in white on a black background. FIG. 2 also shows that with this color scheme, the unactivated symbols are identified by the opposite color. The activated third symbol from the left in FIG. 2 is identified by the white top surface of the protruding index plate 19.

The embodiment of FIG. 2 can additionally be provided with a cover plate similar to plate 16 of FIG. 1, covering the index plates 19 even when in their forwardly protruding positions. In this case the cover plate may be provided with apertures similar to those shown at 18 in FIG. 1.

Owing to the relative spacing of the cooperating slide and index elements, a small rotation of the controlling cam will yield a conspicuous indication on a subject scale extending all along the edge of the camera. The adjusting member may really be operated "blindly," since the symbols tell all that is happening inside the camera.

The specific symbols 17 denote, from the left side of drawings towards the right side (that is, from the right side of the camera towards its left side as seen by an operator from behind the camera), the following combinations of settings:

(a) "Horse with Rider," denoting speed;
(b) "Mountains, Trees and House," denoting landscape;
(c) "Group of Persons," denoting a group picture;
(d) "Bust," denoting portrait;
(e) "Lighting," denoting a flash-light exposure; and
(f) "Aperture," denoting a so-called "bulb" or time exposure.

The settings (a) to (c) provide ranges of 8, 6 and 4 meters, respectively, while the remaining settings involve a 2 meter adjustment. Setting (a) produces an exposure of $\frac{1}{250}$ of a second, with settings (b), (c) and (d), (e) yielding respective exposures of $\frac{1}{125}$ and $\frac{1}{30}$ of a second. Case (f) opens and closes the shutter as the release knob is actuated. Accordingly, individual predetermined diaphragm settings prevail for each of the outdoor subjects of the cases (a) to (d), while for cases (e) and (f) the diaphragm vanes are opened to a value of 5.6, corresponding to a film sensitivity of 18° DIN, suitable for indoor picture taken by flashlight.

The above-mentioned values are given as a matter of example only and it is not intended to limit the operation of the indicator means to these or to any other values or combinations of settings.

The cooperation of the adjusting and controlling elements of a camera equipped with indicator means according to the present invention is further explained with reference to FIG. 3. The mode of operation of a camera of this type is as follows: The shutter is cocked by turning the cocking lever 44 in the clockwise direction. FIG. 3 shows the lever 44 held in the cocked position by a release lever 40' operatively connected to the release knob 40. As a next step, the range and the time are set by turning the adjusting member 4 of FIGS. 1 or 2 (not shown in the schematic sectional view of FIG. 3). This will simultaneously displace the objective 3 within its barrel and adjust the shutter 2 to the predetermined exposure time. The combination of range-time settings, as explained hereinabove, is transmitted from the control cam 6 through the arm 9 to the slide 12a (or 12b in FIG. 2), where one of the symbols 17 will indicate the particular combination selected. The cam 6 may be operatively connected to the exposure meter shown at 51 with its control and limiting elements. For the sake of clarity, the slide and the indexes have been omitted from FIG. 3 which, on the other hand, illustrates a number of structural elements not necessary for the understanding of the indicator means forming the subject matter of the present invention. The exposure itself is accomplished by pushing in the release knob 40, whereupon the cocking lever 44 of the shutter 2 runs down, followed by the other cooperating elements of the mechanism.

In the alternative embodiment which does not have a manually operable cocking lever 44, the film-transporting mechanism is connected to lever 44 which is cocked by clockwise rotation whenever the film is transported for the next exposure. The cooperation of the adjusting and controlling elements is otherwise identical with that described in the foregoing paragraph.

Full particulars of the camera mechanism shown in FIG. 3 are given in a copending and coassigned patent application of one of the joint inventors of the present case, namely Klaus Hintze, jointly with the co-inventors Siegfried Boehm, Werner Hahn, Walter Hennings, and Johannes Weise. This patent application has been filed in the U.S. Patent Office on January 16, 1961, under Serial No. 82,896, now U.S. Pat. No. 3,072,031. FIG. 3 of the present case, being identical with FIG. 2 of that application, has been shown merely for purposes of illustrating the operation of a camera of this type. The subject matter of the copending application is not claimed in the present case.

It should be understood, of course, that the foregoing disclosure of the indicator means for cameras relates only to preferred embodiments of the invention and that it is intended to cover all changes and modifications of the examples described which do not constitute departures from the spirit and scope of the invention as set forth in the appended claims.

We claim:

1. Indicator means for cameras having a housing, an objective, range adjusting means for said objective, a shutter, a diaphragm and setting means for selecting one of a plurality of exposure settings each comprising a predetermined combinative adjustment of said range adjusting means, said shutter and said diaphragm, said setting means comprising a manually operable sole setting member arranged coaxially with and manually rotatable for adjustment around said objective, comprising a subject scale including a spaced-apart and equidistant symbol for each of said exposure settings, index means cooperating with said subject scale for denoting a selected one of said settings, and means for transmitting the rotational movement of said setting member to said index means, whereby said exposure settings may be ascertained from said subject scale without observing the position of said setting means.

2. Indicator means as set forth in claim 1, wherein said subject scale is provided along substantially the full length of said camera housing.

3. Indicator means as set forth in claim 1, wherein said index means comprises an elongated member reciprocable along said camera housing and a plurality of spaced-apart and equidistant index members attached to said elongated member, each of said index members cooperating with one of said symbols of the subject scale.

4. Indicator means as set forth in claim 3, wherein the difference between the distance of the remotest ones of said index members and the distance of the remotest ones of said symbols is smaller than the distance between two adjoining ones of said symbols, so that during the translation of said elongated member only one of said index members faces the cooperating one of said symbols at any given moment.

5. Indicator means as set forth in claim 1, wherein said index means is provided with a plurality of spaced-apart and equidistant indexes, said camera housing has a portion partly covering said index means and having apertures therein substantially aligned with said symbols of the subject scale, whereby said selected one of the settings will be denoted by the appearance of one of said indexes behind one of said apertures.

6. Indicator means as set forth in claim 1, wherein said index means is provided with a plurality of projections and with an equal number of spaced-apart and equidistant index plates each being aligned with, biased against and cooperating with one of said projections, each of said index plates being substantially aligned with one of said symbols of the subject scale, whereby said selected one of the settings will be denoted by the movement of one of said index plates towards the aligned one of said symbols.

7. Indicator means for cameras having a housing, an objective, a shutter, a diaphragm and adjusting means for selecting one of a plurality of settings for the exposure time and the range, comprising a subject scale including a symbol for each of said settings, index means cooperating with said subject scale for denoting a selected one of said settings, and transmission means for operatively connecting said index means to said adjusting means, said adjusting means comprising an adjusting member arranged coaxially with and manually rotatable for adjustment around said objective, said transmission means comprising a cam disk for transmitting the continuous rotational movement of said adjusting member in a stepwise fashion to said index means, whereby said selected setting may be ascertained from said subject scale alone without observing the position of said adjusting means.

8. Indicator means as set forth in claim 7, wherein said index means comprises an elongated member reciprocable along said camera housing, said transmission means being adapted to move said elongated member in a linear direction as a result of the rotational movement of said adjusting member, whereby a small rotational displacement of said adjusting member is transformed into a relatively large linear motion of said elongated member.

9. Indicator means for cameras having a housing, an objective, a shutter, a diaphragm and adjusting means for selecting one of a plurality of settings for the exposure time and the range, comprising a subject scale including a spaced-apart equidistant symbol for each of said settings, index means cooperating with said subject scale for denoting a selected one of said settings, said index means comprising an elongated member reciprocable along said camera housing and a plurality of spaced-apart and equidistant index members attached to said elongated member, each of said index members cooperating with one of said symbols of the subject scale, and transmission means for operatively connecting said index means to said adjusting means, said adjusting means comprising an adjusting member arranged coaxially with and manually rotatable for adjustment around said objective, the distance of two adjacent ones of said index members differing from the distance of two adjacent ones of said symbols by an amount which is the quotient of said distance of the adjacent symbols and the number of said symbols of the subject scale, whereby said settings may be ascertained from said subject scale without observing the position of said adjusting member.

References Cited in the file of this patent

UNITED STATES PATENTS 2,917,984   Faulhaber _____ Dec. 22, 1959